United States Patent
Ota et al.

(10) Patent No.: US 9,154,742 B2
(45) Date of Patent: Oct. 6, 2015

(54) TERMINAL LOCATION SPECIFYING SYSTEM, MOBILE TERMINAL AND TERMINAL LOCATION SPECIFYING METHOD

(75) Inventors: Manabu Ota, Tokyo (JP); Yasuo Morinaga, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 13/698,418

(22) PCT Filed: May 10, 2011

(86) PCT No.: PCT/JP2011/060779
§ 371 (c)(1),
(2), (4) Date: Jan. 9, 2013

(87) PCT Pub. No.: WO2011/145482
PCT Pub. Date: Nov. 24, 2011

(65) Prior Publication Data
US 2013/0107038 A1 May 2, 2013

(30) Foreign Application Priority Data
May 17, 2010 (JP) ................. P2010-113304

(51) Int. Cl.
*H04N 7/18* (2006.01)
*H04N 5/33* (2006.01)
(Continued)

(52) U.S. Cl.
CPC ............. *H04N 7/18* (2013.01); *G01C 21/20* (2013.01); *G01C 21/3602* (2013.01); *G01C 21/3679* (2013.01); *G01S 5/0018* (2013.01);
(Continued)

(58) Field of Classification Search
None
See application file for complete search history.

(56) References Cited

U.S. PATENT DOCUMENTS 8,116,975 B2 * 2/2012 Stavaeus et al. .............. 348/144
8,326,456 B2 * 12/2012 Sakata et al. .................. 700/245
(Continued)

FOREIGN PATENT DOCUMENTS

| JP | 2001 235534 | 8/2001 |
|----|-------------|--------|
| JP | 2006-322832 | 11/2006 |
| JP | 2007-67487 | 3/2007 |

OTHER PUBLICATIONS

International Preliminary Report on Patentability issued Dec. 20, 2012, in PCT/JP2011/060779.
(Continued)

*Primary Examiner* — Jeremaiah C Hallenbeck-Huber
*Assistant Examiner* — Samuel D Fereja
(74) *Attorney, Agent, or Firm* — Oblon, McClelland, Maier & Neustadt, L.L.P.

(57) ABSTRACT

In a terminal location specifying system, landmark information of a landmark located within a specified distance from an approximate position is retrieved based on approximate position information of a mobile terminal, and the retrieved landmark information is transmitted to the mobile terminal. The mobile terminal can thereby acquire the landmark information about the landmark located in the vicinity of the mobile terminal. Further, because the landmark information pre-stored in a server is transmitted to the mobile terminal, it is possible to reliably specify the position of the mobile terminal based on the landmark image. Then, the photographing position of the image is analyzed based on the landmark image, and the photographing position is managed as the located position of the mobile terminal and used for position correction, and it is thus possible to accurately specify the position of the mobile terminal.

13 Claims, 13 Drawing Sheets

(51) Int. Cl.
*G01C 21/20* (2006.01)
*G01C 21/36* (2006.01)
*G08G 1/005* (2006.01)
*G08G 1/13* (2006.01)
*G01S 5/00* (2006.01)
*G01S 5/02* (2010.01)

(52) U.S. Cl.
CPC ............. *G01S 5/0257* (2013.01); *G08G 1/005* (2013.01); *G08G 1/13* (2013.01)

(56) References Cited

U.S. PATENT DOCUMENTS 8,368,759 B2 * 2/2013 Yoo et al. ..................... 348/164
2004/0071315 A1 * 4/2004 Neely ........................... 382/103
2006/0293810 A1 * 12/2006 Nakamoto ..................... 701/28
2008/0021636 A1 * 1/2008 Stavaeus et al. ............. 701/207
2008/0221730 A1 * 9/2008 Sakata et al. ................. 700/245
2009/0167919 A1 * 7/2009 Anttila et al. ............ 348/333.02
2009/0214082 A1 * 8/2009 Hoshi ........................... 382/106
2010/0188510 A1 * 7/2010 Yoo et al. ...................... 348/164

OTHER PUBLICATIONS

English Translation of the Written Opinion of the International Searching Authority issued Aug. 9, 2011, in PCT/JP2011/060779.
Japanese Office Action issued Dec. 18, 2012, in Patent Application No. 2010-113304 (with English-language translation).

* cited by examiner

Fig. 5

| ITEM NUMBER | POSITION (LATITUDE AND LONGITUDE) | NAME | OBJECT INFORMATION | HEIGHT INFORMATION (m) | DIRECTION (DEGREE) | VISIBLE ANGLE (DEGREE) | SIZE (LENGTH×WIDTH ×THICKNESS) (m) |
|---|---|---|---|---|---|---|---|
| 1 | LATITUDE 35 DEGREES 39 MINUTES xxxx SECONDS LONGITUDE 139 DEGREES 44 MINUTES xxxx SECONDS | XXX SIGNBOARD | XXX | 3 | 15.12 | HORIZONTAL: -70~70 VERTICAL: -80~80 | 1.5 5 0.5 |
| 2 | LATITUDE 35 DEGREES 39 MINUTES xxxx SECONDS LONGITUDE 139 DEGREES 44 MINUTES xxxx SECONDS | YYY SIGNBOARD | YYY | 40 | 35.11 | HORIZONTAL: -70~70 VERTICAL: -40~40 | 8 25 1 |
| 3 | ... | ... | ... | ... | ... | ... | ... |

31

Fig.10
(a)
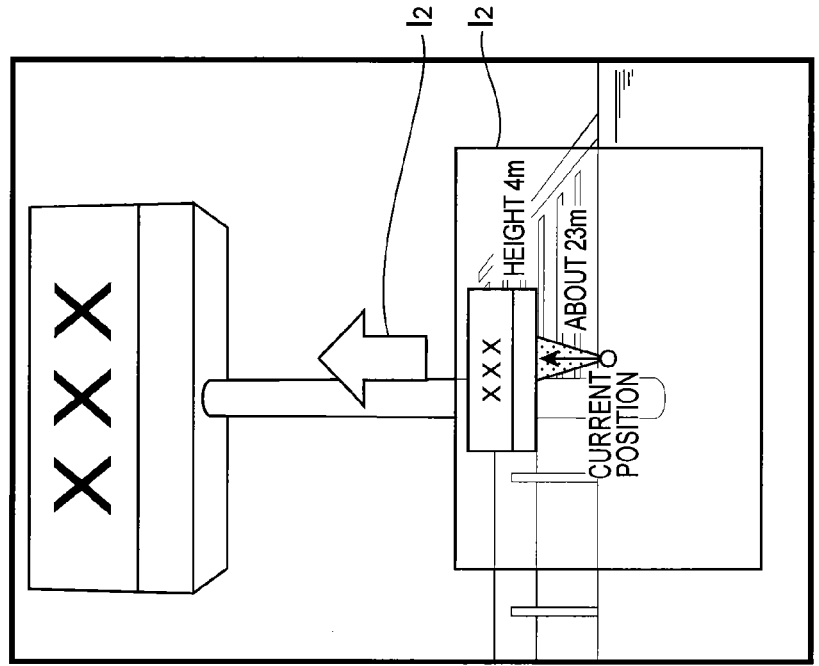
(b)
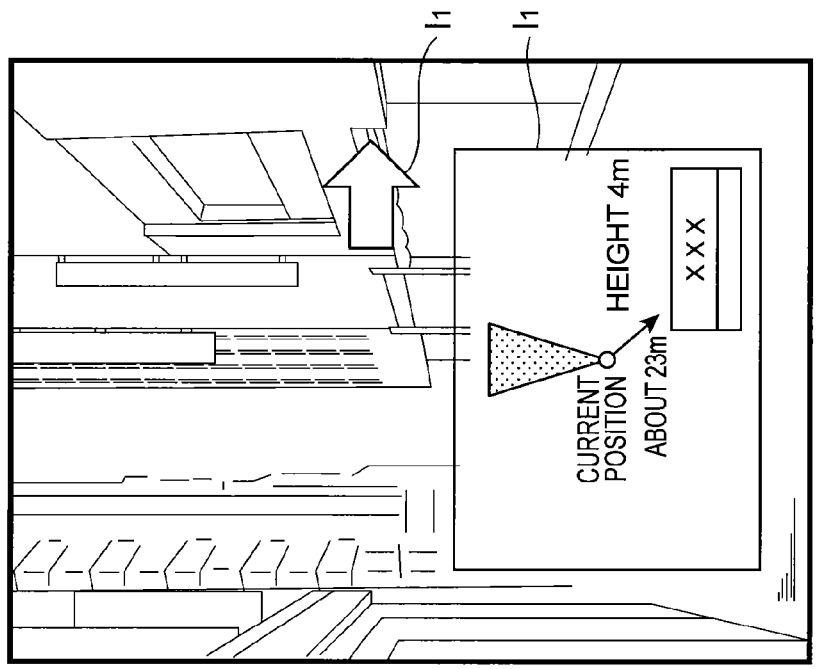

TERMINAL LOCATION SPECIFYING SYSTEM, MOBILE TERMINAL AND TERMINAL LOCATION SPECIFYING METHOD

TECHNICAL FIELD

The present invention relates to a terminal location specifying system, a mobile terminal, and a terminal location specifying method.

BACKGROUND ART

In recent years, a service using AR (Augmented Reality) technology has been developed and provided. For example, a technique that acquires an object placed in the vicinity of the located position of a mobile terminal and displays an object including various information and images superimposed on an image acquired by a camera included in the mobile terminal is known. In this technique, an object to be superimposed is selected based on the located position of the mobile terminal. Further, the mobile terminal displays an object based on a positional relationship between the located position of the terminal itself and the position of the object. It is thus important in this technique to accurately detect the located position of the mobile terminal. For example, a technique that acquires the position of an arbitrary landmark object captured by a camera included in a terminal device from a database that pre-stores the positional information of landmark objects and calculates the position of the terminal device based on the acquired position of the landmark object is known (for example, see Patent Literature 1).

CITATION LIST

Patent Literature

PTL 1: Japanese Unexamined Patent Application Publication No. 2001-235534

SUMMARY OF INVENTION

Technical Problem

However, in the related art, the position of the terminal device cannot be specified unless information about a landmark object photographed by the terminal device does not exist in the database. Further, the volume of a database becomes enormous if the database stores information about all structures that can be a landmark object in order to specify the position of the terminal device based on a landmark object that is randomly photographed.

The present invention has been accomplished to solve the above problems and an object of the present invention is thus to provide a terminal location specifying system, a mobile terminal, and a terminal location specifying method that can accurately and reliably specify the position of the mobile terminal in the AR technology.

Solution to Problem

To solve the above problem, a terminal location specifying system according to one embodiment of the present invention is a terminal location specifying system for specifying a position of a mobile terminal, the system including the mobile terminal and a server capable of communicating with the mobile terminal, the mobile terminal including an approximate position measurement means for measuring an approximate position where the mobile terminal is located, an approximate position information transmitting means for transmitting approximate position information about the approximate position measured by the approximate position measurement means to the server, a landmark information receiving means for receiving landmark information about a landmark from the server, the landmark being a photographing object to be photographed by the mobile terminal for specifying the position of the mobile terminal, a landmark photographing means for photographing the landmark indicated by the landmark information received by the landmark information receiving means, a landmark image transmitting means for transmitting a landmark image being an image of the landmark photographed by the landmark photographing means to the server, a position information receiving means for receiving terminal position information indicating a position of the mobile terminal when the landmark image has been photographed from the server, and a position information management means for managing a position indicated by the terminal position information received by the position information receiving means as a located position of the mobile terminal, and the server including an approximate position information receiving means for receiving the approximate position information transmitted from the mobile terminal, a landmark information storage means for storing a plurality of landmark information, a landmark retrieval means for retrieving the landmark information of the landmark located within a pre-specified distance from the approximate position from the landmark information storage means based on the approximate position information received by the approximate position information receiving means, a landmark information transmitting means for transmitting the landmark information retrieved by the landmark retrieval means to the mobile terminal, a landmark image receiving means for receiving the landmark image transmitted from the mobile terminal, a terminal position analysis means for analyzing the position of the mobile terminal when the landmark image has been photographed based on the landmark image received by the landmark image receiving means, and a terminal position information transmitting means for transmitting the position of the mobile terminal analyzed by the terminal position analysis means as terminal position information to the mobile terminal.

To solve the above problem, a mobile terminal according to one embodiment of the present invention is a mobile terminal in a terminal location specifying system for specifying a position of a mobile terminal, the system including the mobile terminal and a server capable of communicating with the mobile terminal, the mobile terminal including an approximate position measurement means for measuring an approximate position where the mobile terminal is located, an approximate position information transmitting means for transmitting approximate position information about the approximate position measured by the approximate position measurement means to the server, a landmark information receiving means for receiving landmark information about a landmark from the server, the landmark being a photographing object to be photographed by the mobile terminal for specifying the position of the mobile terminal, a landmark photographing means for photographing the landmark indicated by the landmark information received by the landmark information receiving means, a landmark image transmitting means for transmitting a landmark image being an image of the landmark photographed by the landmark photographing means to the server, a position information receiving means for receiving terminal position information indicating a position of the mobile terminal when the landmark image has been photographed from the server, and a position information management means for managing a position indicated by the terminal position information received by the position information receiving means as a located position of the mobile terminal.

Further, to solve the above problem, a terminal location specifying method according to one embodiment of the present invention is a terminal location specifying method in a terminal location specifying system for specifying a position of a mobile terminal, the system including the mobile terminal and a server capable of communicating with the mobile terminal, the method including an approximate position measurement step of measuring an approximate position where the mobile terminal is located by the mobile terminal, an approximate position information transmitting step of transmitting approximate position information about the approximate position measured in the approximate position measurement step from the mobile terminal to the server, an approximate position information receiving step of receiving the approximate position information transmitted in the approximate position information transmitting step by the server, a landmark retrieval step of retrieving the landmark information of the landmark located within a pre-specified distance from the approximate position by the server based on the approximate position information received in the approximate position information receiving step by referring to a landmark information storage means storing a plurality of landmark information about a landmark being a photographing object to be photographed by the mobile terminal for specifying the position of the mobile terminal, a landmark information transmitting step of transmitting the landmark information retrieved in the landmark retrieval step from the server to the mobile terminal, a landmark information receiving step of receiving the landmark information from the server by the mobile terminal, a landmark photographing step of photographing the landmark indicated by the landmark information received in the landmark information receiving step by the mobile terminal, a landmark image transmitting step of transmitting a landmark image being an image of the landmark photographed in the landmark photographing step from the mobile terminal to the server, a landmark image receiving step of receiving the landmark image transmitted in the landmark image transmitting step by the server, a terminal position analysis step of analyzing the position of the mobile terminal when the landmark image has been photographed based on the landmark image received in the landmark image receiving step by the server, a terminal position information transmitting step of transmitting the position of the mobile terminal analyzed in the terminal position analysis step as terminal position information from the server to the mobile terminal, a position information receiving step of receiving the terminal position information transmitted in the terminal position information transmitting step by the mobile terminal, and a position information management step of managing a position indicated by the terminal position information received in the position information receiving step as a located position of the mobile terminal by the mobile terminal.

According to the terminal location specifying system, the mobile terminal and the terminal location specifying method, landmark information of a landmark located within a specified distance from an approximate position is retrieved based on approximate position information of the mobile terminal, and the retrieved landmark information is transmitted to the mobile terminal. The mobile terminal can thereby acquire the landmark information about the landmark located in the vicinity of the mobile terminal. Further, because the landmark information pre-stored in the server is transmitted to the mobile terminal, it is possible to reliably specify the position of the mobile terminal based on the landmark image. Then, the photographing position of the image is analyzed based on the landmark image, and the photographing position is managed as the located position of the mobile terminal in the mobile terminal, and it is thus possible to accurately specify the position of the mobile terminal.

Further, in the terminal location specifying system according to one embodiment of the present invention, the mobile terminal may further include a direction measurement means for measuring a viewing direction being a direction of sight in the landmark photographing means, and the approximate position information transmitting means may transmit information about the viewing direction measured by the direction measurement means as direction information, together with the approximate position information, to the server, and the landmark retrieval means may retrieve the landmark information of the landmark located within a pre-specified distance from the approximate position indicated by the approximate position information and located in a specified angular range centering on the viewing direction indicated by the direction information from the landmark information storage means.

In this case, the viewing direction in the landmark photographing means of the mobile terminal is transmitted to the server, the landmark information of the landmark located in the specified angular range centering on the viewing direction is extracted and transmitted to the mobile terminal. The landmark information of the landmark that can be photographed in the mobile terminal is thereby transmitted from the server to the mobile terminal. Thus, the landmark image can be reliably acquired, and it is possible to reliably specify the position of the mobile terminal.

Further, in the terminal location specifying system according to one embodiment of the present invention, the server may further include a map data storage means for storing map data, and the landmark retrieval means may refer to the map data storage means and retrieve the landmark information of the landmark located within a pre-specified distance from the approximate position indicated by the approximate position information and where a shield does not exist between the approximate position and the landmark from the landmark information storage means.

In this case, the landmark information of the landmark having no shield between the located position of the mobile terminal and the landmark is extracted based on the map data and transmitted to the mobile terminal. The landmark information of the landmark that can be photographed in the mobile terminal is thereby transmitted from the server to the mobile terminal. Thus, the landmark image can be reliably acquired, and it is possible to reliably specify the position of the mobile terminal.

Further, in the terminal location specifying system according to one embodiment of the present invention, the landmark information may contain a visible angle being information indicating an angular range with respect to a facing direction of the landmark where the landmark is visible, and when the approximate position is located within the angular range indicated by the visible angle of the landmark, the landmark retrieval means may retrieve the landmark information of the landmark from the landmark information storage means.

In this case, the landmark information of the landmark that is visible from the mobile terminal is transmitted from the server to the mobile terminal. Thus, the landmark image can be reliably acquired, and it is possible to reliably specify the position of the mobile terminal.

Further, in the terminal location specifying system according to one embodiment of the present invention, the landmark retrieval means may retrieve the landmark information of the landmark where, when the landmark is photographed by the landmark photographing means, a region size of an image of the landmark with respect to a whole photographed image is within a range of a prescribed size from the landmark information storage means.

In this case, the landmark information of the landmark that is displayed in an appropriate size on the mobile terminal is transmitted from the server to the mobile terminal. Thus, the photographing of the landmark in the mobile terminal and the analysis of the position of the mobile terminal based on the landmark image become easy.

Further, in the terminal location specifying system according to one embodiment of the present invention, the landmark information may contain landmark position information indicating a located position of the landmark, and the mobile terminal may further include a landmark guide means for displaying guide information providing a guide to the position of the landmark on a display means included in the mobile terminal based on a positional relationship between the approximate position of the mobile terminal and the located position of the landmark indicated by the landmark position information.

In this case, the located position of the landmark is guided to a user through the display means of the mobile terminal, and the user can reliably recognize the position of the landmark. Accordingly, the photographing and acquisition of the landmark image can be performed easily.

Further, in the terminal location specifying system according to one embodiment of the present invention, the landmark information may contain information about a height of a position where the landmark is located, and the landmark guide means may display the position and height of the landmark as the guide information on the display means.

In this case, information about the height where the landmark is located is also guided to a user through the display means of the mobile terminal, and the user can more reliably recognize the position of the landmark. Accordingly, the photographing and acquisition of the landmark image are reliably performed.

Further, in the terminal location specifying system according to one embodiment of the present invention, the terminal position analysis means may analyze the position of the mobile terminal when the landmark image has been photographed based on a difference between a position, size and shape of the landmark in a real space and a position, size and shape of the landmark in the landmark image. It is thereby possible to analyze the position of the mobile terminal with high accuracy.

To solve the above problem, a terminal location specifying system according to one embodiment of the present invention is a terminal location specifying system for specifying a position of a mobile terminal, the system including the mobile terminal and a server capable of communicating with the mobile terminal, the mobile terminal including an approximate position measurement means for measuring an approximate position where the mobile terminal is located, an approximate position information transmitting means for transmitting approximate position information about the approximate position measured by the approximate position measurement means to the server, a landmark information receiving means for receiving landmark information about a landmark from the server, the landmark being a photographing object to be photographed by the mobile terminal for specifying the position of the mobile terminal, a landmark photographing means for photographing the landmark indicated by the landmark information received by the landmark information receiving means, a photographing position analysis means for analyzing a located position of the mobile terminal when a landmark image has been photographed based on the landmark image being an image of the landmark photographed by the landmark photographing means, a position information management means for managing information about the located position of the mobile terminal analyzed by the photographing position analysis means, and the server including an approximate position information receiving means for receiving the approximate position information transmitted from the mobile terminal, a landmark information storage means for storing a plurality of landmark information, a landmark retrieval means for retrieving the landmark information of the landmark located within a pre-specified distance from the approximate position from the landmark information storage means based on the approximate position information received by the approximate position information receiving means, and a landmark information transmitting means for transmitting the landmark information retrieved by the landmark retrieval means to the mobile terminal.

To solve the above problem, a mobile terminal according to one embodiment of the present invention is a mobile terminal in a terminal location specifying system for specifying a position of a mobile terminal, the system including the mobile terminal and a server capable of communicating with the mobile terminal, the mobile terminal including an approximate position measurement means for measuring an approximate position where the mobile terminal is located, an approximate position information transmitting means for transmitting approximate position information about the approximate position measured by the approximate position measurement means to the server, a landmark information receiving means for receiving landmark information about a landmark from the server, the landmark being a photographing object to be photographed by the mobile terminal for specifying the position of the mobile terminal, a landmark photographing means for photographing the landmark indicated by the landmark information received by the landmark information receiving means, a photographing position analysis means for analyzing a located position of the mobile terminal when a landmark image has been photographed based on the landmark image being an image of the landmark photographed by the landmark photographing means, a position information management means for managing information about the located position of the mobile terminal analyzed by the photographing position analysis means.

Further, to solve the above problem, a terminal location specifying method according to one embodiment of the present invention is a terminal location specifying method in a terminal location specifying system for specifying a position of a mobile terminal, the system including the mobile terminal and a server capable of communicating with the mobile terminal, the method including an approximate position measurement step of measuring an approximate position where the mobile terminal is located by the mobile terminal, an approximate position information transmitting step of transmitting approximate position information about the approximate position measured in the approximate position measurement step from the mobile terminal to the server, an approximate position information receiving step of receiving the approximate position information transmitted in the approximate position information transmitting step by the server, a landmark retrieval step of retrieving the landmark information of the landmark located within a pre-specified distance from the approximate position by the server based on the approximate position information received in the approximate position information receiving step by referring to a landmark information storage means storing a plurality of landmark information about a landmark being a photographing object to be photographed by the mobile terminal for specifying the position of the mobile terminal, a landmark information transmitting step of transmitting the landmark information retrieved in the landmark retrieval step from the server to the mobile terminal, a landmark information receiving step of receiving the landmark information from the server by the mobile terminal, a landmark photographing step of photographing the landmark indicated by the landmark information received in the landmark information receiving step by the mobile terminal, a photographing position analysis step of analyzing a located position of the mobile terminal when a landmark image has been photographed by the mobile terminal based on the landmark image being an image of the landmark photographed in the landmark photographing step, and a position information management step of managing information about the located position of the mobile terminal analyzed in the photographing position analysis step by the mobile terminal.

According to the terminal location specifying system, the mobile terminal and the terminal location specifying method, landmark information of a landmark located within a specified distance from an approximate position is retrieved based on approximate position information of the mobile terminal, and the retrieved landmark information is transmitted to the mobile terminal. The mobile terminal can thereby acquire the landmark information about the landmark located in the vicinity of the mobile terminal. Further, because the landmark information pre-stored in the server is transmitted to the mobile terminal, it is possible to reliably specify the position of the mobile terminal based on the landmark image. Then, the photographing position of the image is analyzed based on the landmark image, and the photographing position is managed as the located position of the mobile terminal in the mobile terminal, and it is thus possible to accurately and easily specify the position of the mobile terminal.

Advantageous Effects of Invention

It is possible to accurately and reliably specify the position of the mobile terminal in the AR technology.

BRIEF DESCRIPTION OF DRAWINGS

FIG. 5 is a diagram showing a configuration of a landmark information storage unit and an example of data stored therein.
FIG. 10 is a diagram showing an example of guide information displayed on a display unit 19.

DESCRIPTION OF EMBODIMENTS

Figure 1:
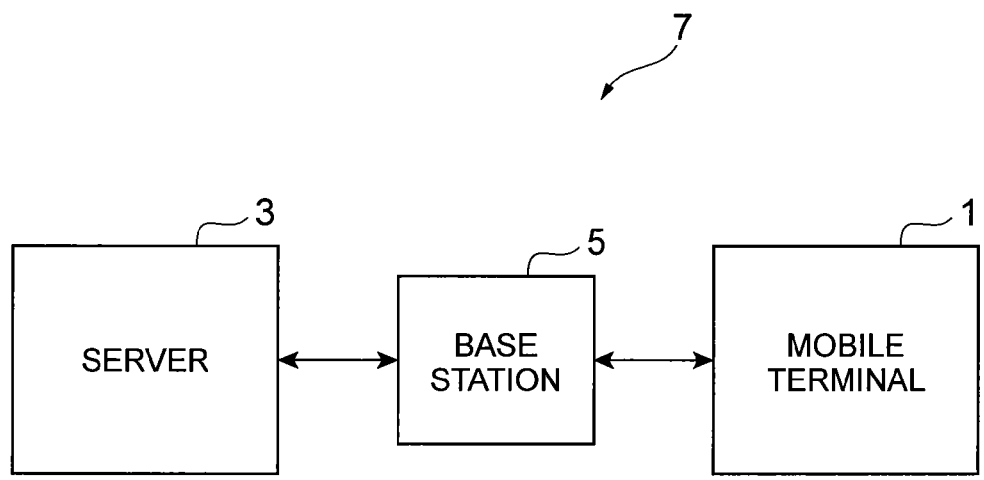
FIG. 1 is a diagram showing a device configuration of a terminal location specifying system.

Embodiments of a terminal location specifying system, a mobile terminal, and a terminal location specifying method according to the present invention are described hereinafter with reference to the drawings. Note that, where possible, the same elements are denoted by the same reference numerals and redundant description thereof is omitted.

First Embodiment

FIG. 1 is a diagram showing a device configuration of a terminal location specifying system 7 according to a first embodiment. As shown in FIG. 1, the terminal location specifying system 7 includes a mobile terminal 1 and a server 3 that can communicate with the mobile terminal 1. The mobile terminal 1 is a portable terminal that can perform communication through a mobile communication network, for example. Thus, the mobile terminal 1 communicates with the server through a base station 5, which is a mobile communication network.

Figure 2:
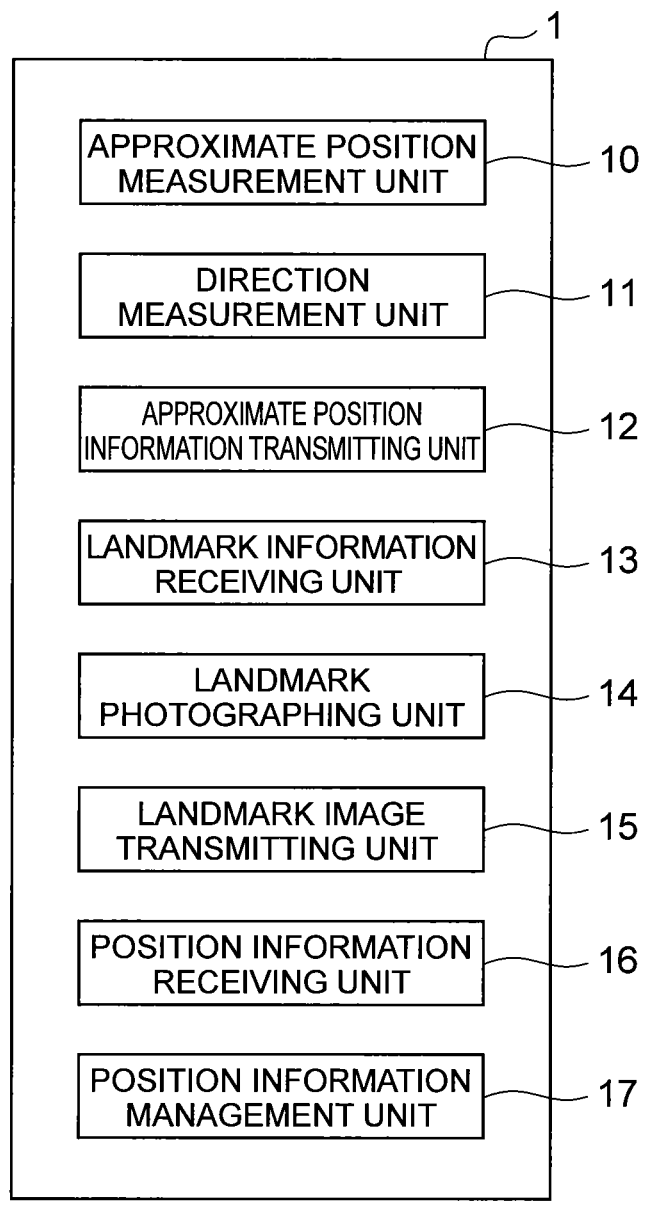
FIG. 2 is a block diagram showing a functional configuration of a mobile terminal according to a first embodiment.

FIG. 2 is a block diagram showing a functional configuration of the mobile terminal 1 according to the first embodiment. The mobile terminal 1 according to this embodiment is a device that controls display of an object placed in the real space or the virtual space, for example, and has a function of acquiring an object placed in the vicinity of the located position of the mobile terminal 1 in the real space or the virtual space from the server and displaying an object including various information and images superimposed on an image in the real space acquired by a camera included in the mobile terminal 1. In order to accurately control the display position of an object on a display means such as a display of the mobile terminal 1, it is necessary to accurately detect the located position of the mobile terminal 1 in this embodiment.

As shown in FIG. 2, the mobile terminal 1 includes, as functional components, an approximate position measurement unit 10 (approximate position measurement means), a direction measurement unit 11 (direction measurement means), an approximate position information transmitting unit 12 (approximate position information transmitting means), a landmark information receiving unit 13 (landmark information receiving means), a landmark photographing unit 14 (landmark photographing means), a landmark image transmitting unit 15 (landmark image transmitting means), a position information receiving unit 16 (position information receiving means), and a position information management unit 17 (position information management means).

Figure 3:
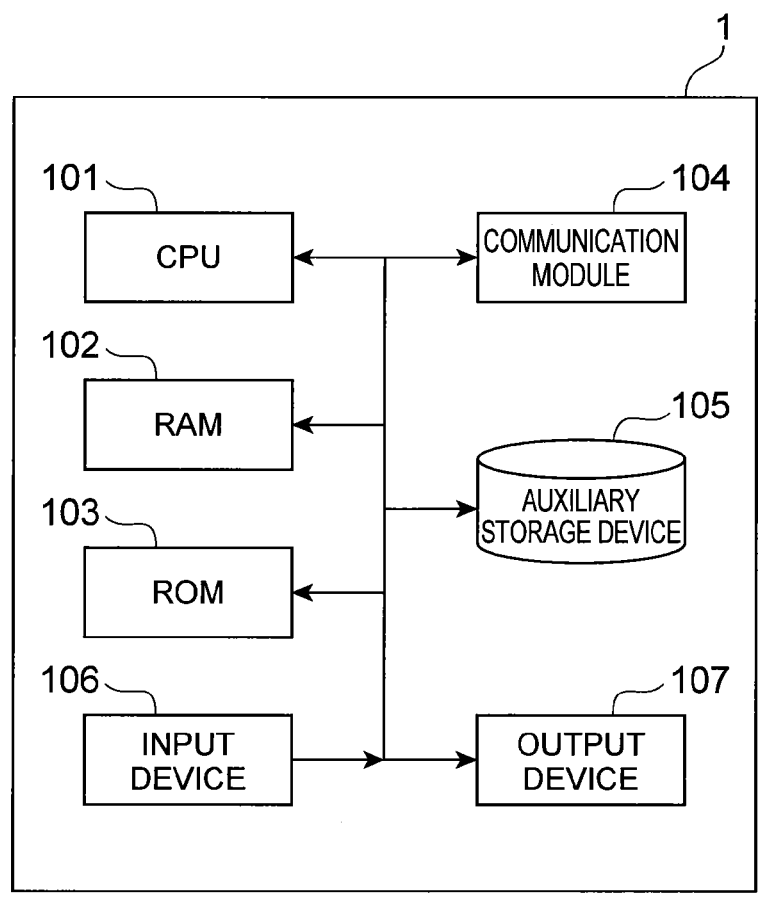
FIG. 3 is a hardware block diagram of a mobile terminal.

FIG. 3 is a hardware block diagram of the mobile terminal 1. As shown in FIG. 3, the mobile terminal 1 is physically configured as a computer system that includes a CPU 101, a RAM 102 and a ROM 103 which are a main storage device, a communication module 104 which is a data transmitting and receiving device, an auxiliary storage device 105 such as a hard disk or flash memory, an input device 106 such as a keyboard, an output device 107 such as a display and the like.

The functions shown in FIG. 2 are implemented by loading given computer software onto hardware such as the CPU 101 or the RAM 102 shown in FIG. 3, making the communication module 104, the input device 106 and the output device 107 operate under control of the CPU 101, and performing reading and writing of data in the RAM 102 or the auxiliary storage device 105. The respective functional units of the terminal location specifying system 7 are described hereinafter in detail with reference back to FIG. 2.

The approximate position measurement unit 10 is a part that measures an approximate position where the mobile terminal 1 is located. The approximate position measurement unit 10 may be a GPS device, for example. The position measurement by the GPS contains errors caused by the principle of measurement. Accordingly, a position measured by the approximate position measurement unit 10 is an approximate position. The approximate position measurement unit 10 sends approximate position information about the approximate position to the approximate position information transmitting unit 12.

The direction measurement unit 11 is a part that measures a viewing direction, which is the line of sight in the landmark photographing unit 14. The direction measurement unit 11 sends information about the measured viewing direction as direction information to the approximate position information transmitting unit 12.

The approximate position information transmitting unit 12 is a part that transmits the approximate position information about the approximate position measured by the approximate position measurement unit 10 to the server 3. Further, when the measurement of the viewing direction by the direction measurement unit 11 has been performed, the approximate position information transmitting unit 12 transmits the direction information, together with the approximate position information, to the server 3.

The landmark information receiving unit 13 is a part that receives landmark information about a landmark from the server. The landmark is a photographing object that exists in the real space and is to be photographed by the mobile terminal 1 for specifying the position of the mobile terminal 1. For example, the landmark is a structure such as a specified building or signboard. Further, the landmark information contains information about the located position of a landmark and object information for recognizing the outer appearance of a landmark. The landmark information is described in detail later.

The landmark photographing unit 14 is a part that photographs a landmark indicated by the landmark information, and it may be a camera, for example. Because a user of the mobile terminal 1 can recognize the located position or the like of a landmark based on the landmark information, the user can photograph the landmark by activating the landmark photographing unit 14. The landmark photographing unit 14 sends the image of the photographed landmark to the landmark image transmitting unit 15.

The landmark image transmitting unit 15 is a part that transmits the landmark image acquired from the landmark photographing unit 14 to the server 3.

The position information receiving unit 16 is a part that receives terminal position information analyzed by the server 3 from the server 3. The terminal position information is information indicating the position of the mobile terminal when the landmark image has been photographed. The analysis of the terminal position information is described later.

The position information management unit 17 is a part that manages a position indicated by the terminal position information received by the position information receiving unit 16 as the located position of the mobile terminal 1. Specifically, the position information management unit 17 uses a position indicated by the terminal position information as a reference position when displaying an object placed in the real space or the virtual space superimposed on an image of the real space acquired by the camera. The mobile terminal 1 acquires an object placed in the vicinity of the mobile terminal 1 in the real space or the virtual space using a position indicated by the terminal position information as a reference position and displays the object based on a positional relationship between the reference position of the mobile terminal 1 and the position of the object.

Figure 4:
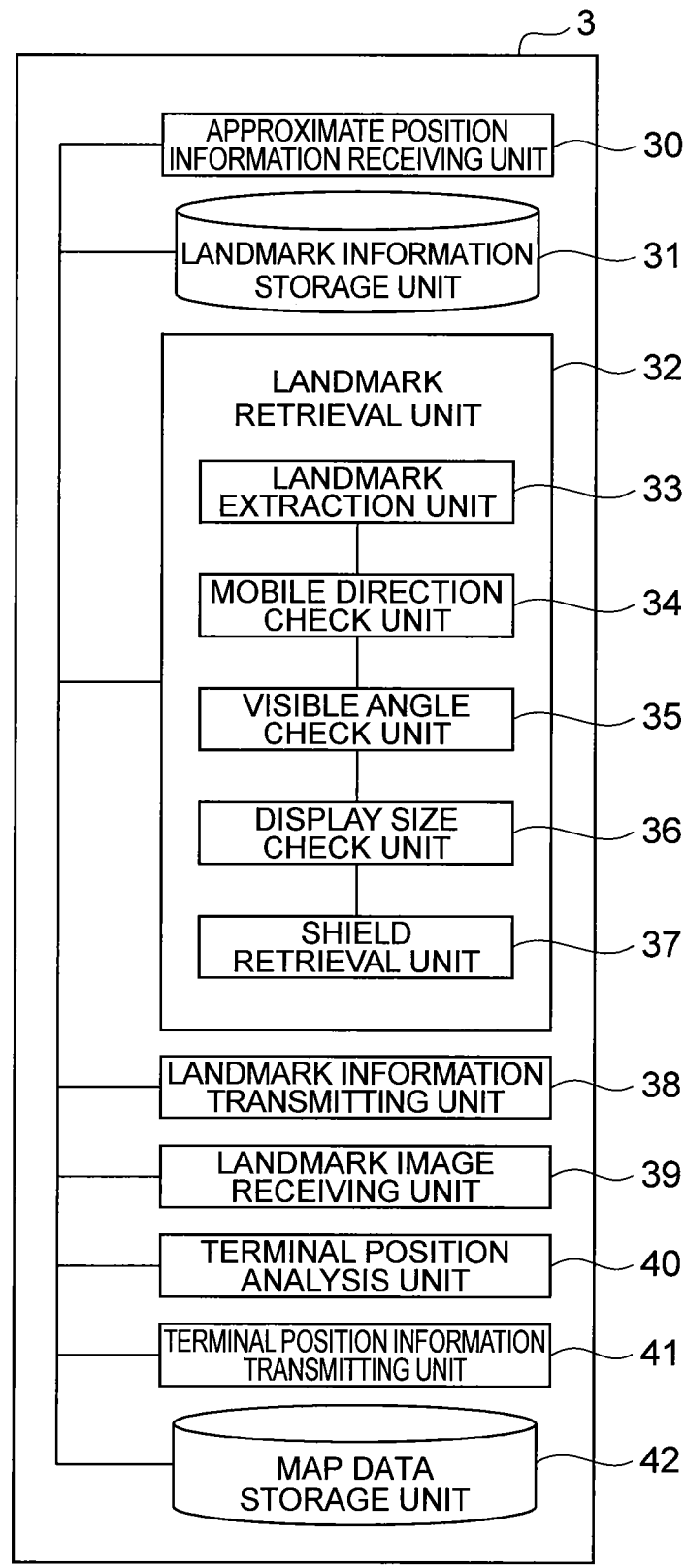
FIG. 4 is a block diagram showing a functional configuration of a server according to the first embodiment.

The functions of the server 3 are described in detail hereinafter. FIG. 4 is a block diagram showing a functional configuration of the server 3 according to the first embodiment. The server 3 according to this embodiment includes an approximate position information receiving unit 30 (approximate position information receiving means), a landmark information storage unit 31 (landmark information storage means), a landmark retrieval unit 32 (landmark retrieval means), a landmark information transmitting unit 38 (landmark information transmitting means), a landmark image receiving unit 39 (landmark image receiving means), a terminal position analysis unit 40 (terminal position analysis means), a terminal position information transmitting unit 41 (terminal position information transmitting means), and a map data storage unit 42 (map data storage means). The server 3 is a computer having a hardware configuration similar to the hardware configuration of the mobile terminal 1 shown in FIG. 3. The respective functional units of the server 3 are described in detail with reference to FIG. 4.

The approximate position information receiving unit 30 is a part that receives the approximate position information transmitted from the mobile terminal 1. Further, when the direction information is transmitted together with the approximate position information from the approximate position information transmitting unit 12, the approximate position information receiving unit 30 receives the approximate position information and the direction information. The approximate position information receiving unit 30 sends the received approximate position information and direction information to the landmark retrieval unit 32.

The landmark information storage unit 31 is a part that stores landmark information. FIG. 5 is a diagram showing the configuration of the landmark information storage unit 31 and an example of data stored therein. As shown in FIG. 5, the landmark information storage unit 31 stores, as landmark information, information about a position, name, object information, height information, direction, visible angle, and size in association with each item number.

The "position" is information indicating the two-dimensional located position of a landmark. The "name" is information indicating the name of the landmark. The "object information" is two-dimensional or three-dimensional data that visually represents the shape of the landmark. The "height information" is information indicating the height of a position where the landmark is located. The "direction" is information about an angle indicating the direction which the landmark directly faces, and it increases as rotating clockwise, starting from the north as 0 degree. The "visible angle" is information indicating the angular range where the landmark is visible. The "horizontal" angular range in the visible angle is set with respect to the direction which the landmark directly faces. Further, the "vertical" angular range in the visible angle is set with respect to the horizontal direction. The "size" is information indicating the size of the outer shape of the landmark.

The landmark retrieval unit 32 is a part that retrieves landmark information of a landmark as a photographing object suitable for specifying the position of the mobile terminal 1 from the landmark information storage unit 31. The landmark retrieval unit 32 includes a landmark extraction unit 33, a mobile direction check unit 34, a visible angle check unit 35, a display size check unit 36, and a shield retrieval unit 37, as shown in FIG. 4.

The landmark extraction unit 33 is a part that extracts landmark information of a landmark located within a prespecified distance from the approximate position from the landmark information storage unit 31 based on the approximate position information of the mobile terminal 1 and information about the "position" in the landmark information storage unit 31.

The mobile direction check unit 34 is a part that checks whether the landmark extracted by the landmark extraction unit 33 is located in the specified angular range centering on the viewing direction of the mobile terminal 1 based on the direction information and the approximate position information from the mobile terminal 1 and information about the "position" in the landmark information storage unit 31.

Figure 6:
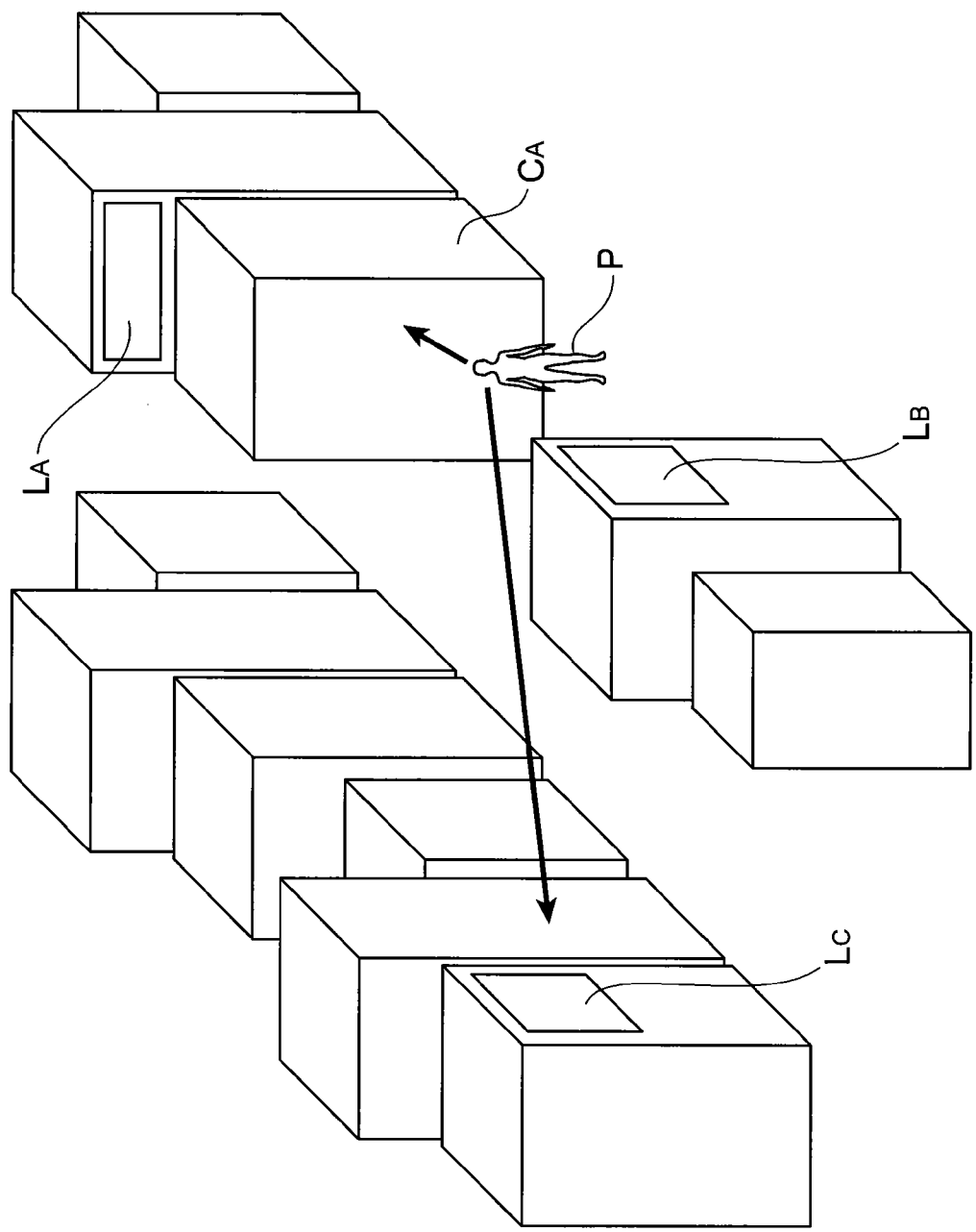
FIG. 6 is a diagram showing a positional relationship between a user having a mobile terminal and a landmark.

The visible angle check unit 35 is a part that checks whether the landmark extracted by the landmark extraction unit 33 is a landmark that is visible from the located position of the mobile terminal 1 based on the approximate position information and the "visible angle" in the landmark information storage unit 31. FIG. 6 is a diagram showing a positional relationship between a user P having the mobile terminal 1 and a landmark. Because the user P has the mobile terminal 1, the located position of the user P is substantially equal to the approximate position of the mobile terminal 1. In FIG. 6, although the located position of the user P is included in the visible angle of the landmark $L_C$, it is not included in the visible angle of the landmark $L_B$. Thus, the visible angle check unit 35 determines the landmark $L_C$ as a landmark visible from the located position of the mobile terminal 1 and determines the landmark $L_B$ as a landmark not visible from the located position of the mobile terminal 1.

The display size check unit 36 is a part that checks whether, the landmark extracted by the landmark extraction unit 33 is a landmark where, when a landmark photographed by the landmark photographing unit 14 of the mobile terminal 1 is displayed on a display unit (not shown) of the mobile terminal 1, the size of a region occupied by the image of the landmark with respect to the whole image on the display unit is within the range of a predetermined size. The size of a region occupied by the image of the landmark on the display unit depends on the distance between the mobile terminal 1 and the landmark and the magnification when the landmark photographing unit 14 captures the landmark. The landmark image for specifying the position of the mobile terminal 1 is preferably displayed in an appropriate size on the display unit. Thus, the landmark information of a landmark suitable for photographing is extracted by the display size check unit 36.

The shield retrieval unit 37 is a part that checks whether the landmark extracted by the landmark extraction unit 33 is a landmark with no shield between the approximate position of the mobile terminal 1 and the landmark based on the map data stored in the map data storage unit 42 and the approximate position information. Referring to FIG. 6, although a shield does not exist between the landmark $L_C$ and the user P, a shield $C_A$ exists between the landmark $L_A$ and the user P. Thus, the shield retrieval unit 37 determines the landmark $L_C$ as a landmark with no shield between the approximate position of the mobile terminal 1 and the landmark, and determines the landmark $L_A$ as a landmark with a shield between the approximate position of the mobile terminal 1 and the landmark.

In the case where the checking and extraction of the landmark information by the display size check unit 36 and the visible angle check unit 35 are performed, the mobile terminal 1 may transmit photographing information related to a photograph viewing angle, focal length, magnification and the like when the landmark photographing unit 14 captures the image of a landmark to the server 3. In this case, the landmark retrieval unit 32 acquires the photographing information transmitted from the mobile terminal 1. Then, the landmark retrieval unit 32 can change thresholds related to the "visible angle" used for checking by the visible angle check unit 35 and the display size used for checking by the display size check unit 36 in accordance with the photographing information. Note that the photographing information may be stored in advance in the server 3.

The landmark retrieval unit 32 sends the landmark information extracted by the functional units 33 to 37 to the landmark information transmitting unit 38. Note that, although the landmark retrieval unit 32 according to this embodiment performs the checking and extraction of the landmark information using the landmark extraction unit 33, the mobile direction check unit 34, the visible angle check unit 35, the display size check unit 36 and the shield retrieval unit 37 in this order, the order is not particularly limited.

The landmark information transmitting unit 38 is a part that transmits the landmark information retrieved by the landmark retrieval unit 32 to the mobile terminal 1.

The landmark image receiving unit 39 is a part that receives the landmark image transmitted from the mobile terminal 1.

The terminal position analysis unit 40 is a part that analyzes and calculates the position of the mobile terminal 1 at the time when the landmark image has been photographed based on the landmark image received by the landmark image receiving unit 39. Specifically, the terminal position analysis unit 40 analyzes the position of the mobile terminal 1 at the time when the landmark image has been photographed based on a difference between the position, size and shape of the landmark in the real space extracted from the landmark information storage unit 31 and the position, size and shape of the landmark in the landmark image.

The terminal position information transmitting unit 41 is a part that transmits the position of the mobile terminal 1 analyzed by the terminal position analysis unit 40 as terminal position information to the mobile terminal.

The map data storage unit 42 is a part that stores map data. The map data contains road shapes, geographic features, positions and shapes of structures such as buildings in the real space.

Figure 7:
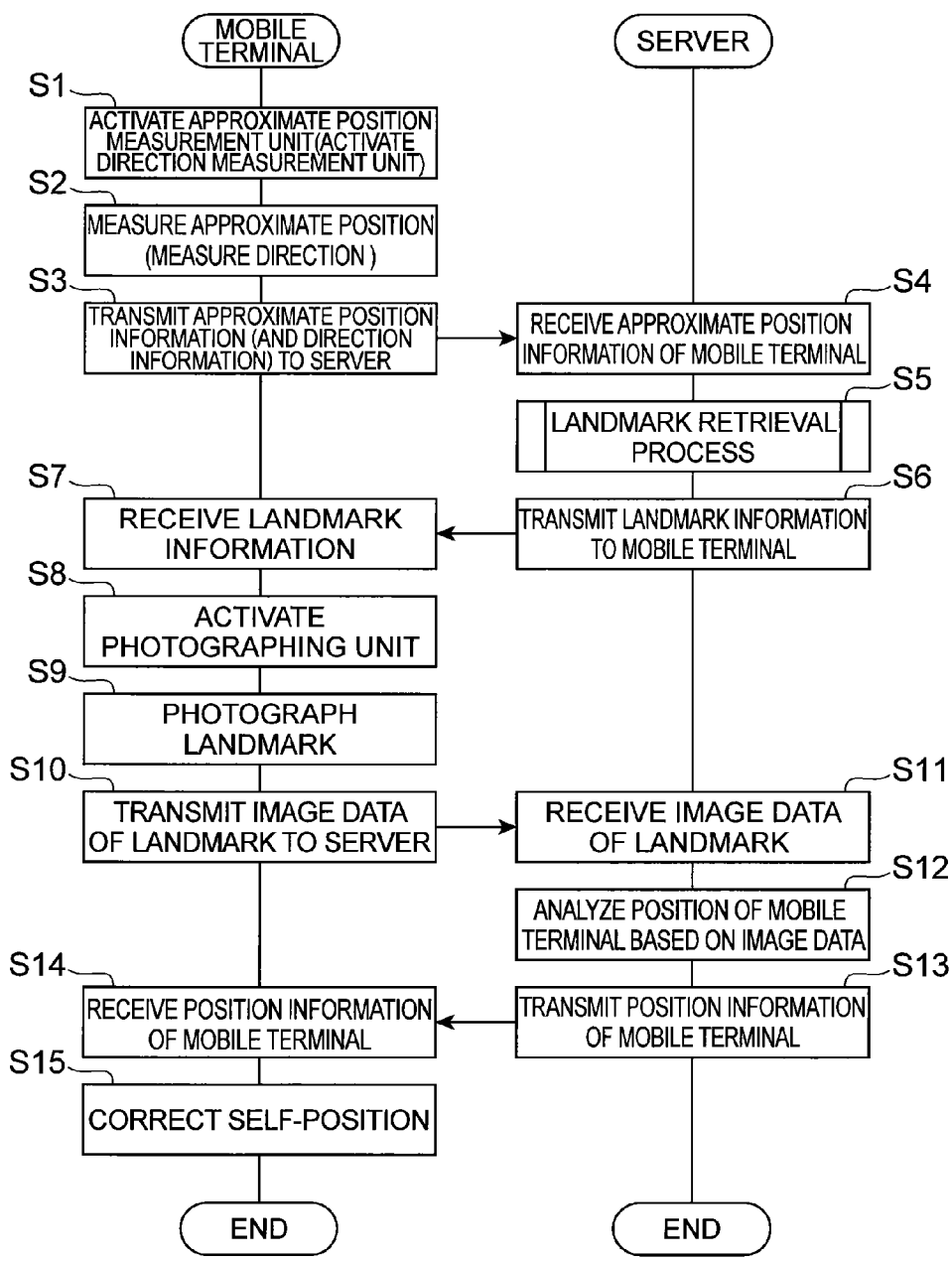
FIG. 7 is a timing chart showing a process of a terminal location specifying method according to the first embodiment.

The operation of the terminal location specifying system 7 in a terminal location specifying method according to this embodiment is described hereinafter with reference to FIG. 7. FIG. 7 is a flowchart showing a process performed in the terminal location specifying system 7.

First, the mobile terminal 1 activates the approximate position measurement unit 10 (S1). Note that the mobile terminal 1 may activate the direction measurement unit 11 at the same time. Next, the approximate position measurement unit 10 measures an approximate position where the mobile terminal 1 is located (S2, approximate position measurement step). Note that, in Step S2, the direction measurement unit 11 may measure the viewing direction in the landmark photographing unit 14. Then, the approximate position information transmitting unit 12 transmits the approximate position information to the server 3 (S3, approximate position information transmitting step). Further, when the measurement of the viewing direction by the direction measurement unit 11 is performed, the approximate position information transmitting unit 12 may transmit the direction information together with the approximate position information to the server 3.

When the approximate position information or the like is transmitted from the mobile terminal 1, the approximate position information receiving unit 30 receives the approximate position information transmitted from the mobile terminal 1 (S4, approximate position information receiving step). Note that, when the direction information is transmitted together with the approximate position information from the approximate position information transmitting unit 12, the approximate position information receiving unit 30 receives the approximate position information and the direction information in Step S4.

Figure 8:
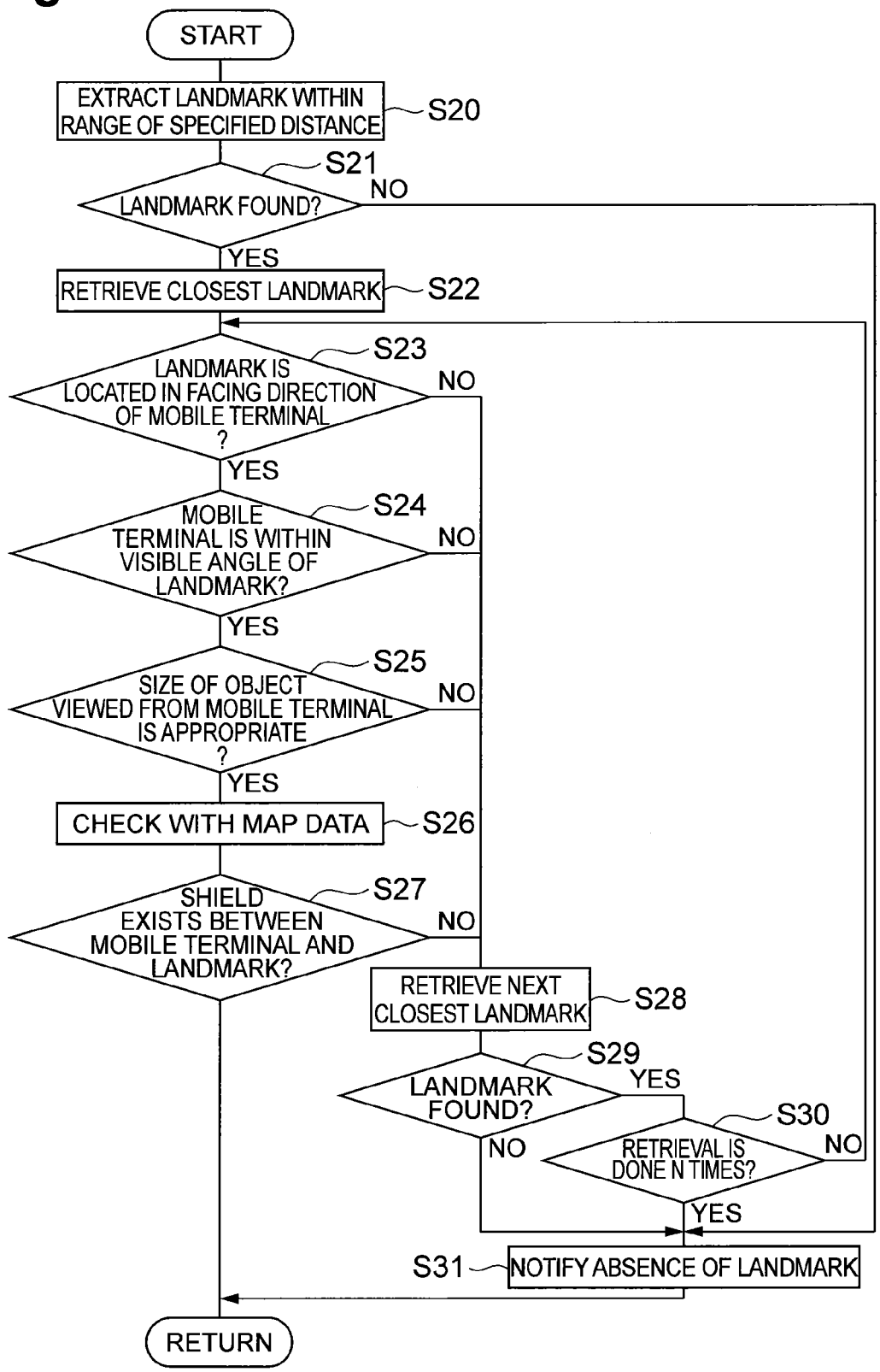
FIG. 8 is a flowchart showing a landmark retrieval process in FIG. 7.

Next, the landmark retrieval unit 32 retrieves landmark information from the landmark information storage unit 31 (S5, landmark retrieval step). The landmark retrieval process is described in detail with reference to FIG. 8. FIG. 8 is a flowchart sowing the landmark retrieval process.

First, the landmark extraction unit 33 extracts landmark information of a landmark located within a pre-specified distance from the approximate position from the landmark information storage unit 31 based on the approximate position information of the mobile terminal 1 and information about the "position" in the landmark information storage unit 31 (S20). When one or more landmarks are extracted in Step S20, the process proceeds to Step S22. On the other hand, when a landmark does not exist within a pre-specified distance from the approximate position in Step S20, the process proceeds to Step S31 (S21).

In Step S22, the landmark retrieval unit 32 extracts a landmark at the shortest distance from the approximate position from the landmarks extracted by the landmark extraction unit 33 (S22).

Then, the mobile direction check unit 34 checks whether the landmark extracted in Step S22 is located in a specified angular range centering on the viewing direction of the mobile terminal 1 based on the direction information and the approximate position information from the mobile terminal 1 and information about the "position" in the landmark information storage unit 31 (S23). When it is determined that the landmark being checked is located in the specified angular range centering on the viewing direction of the mobile terminal 1, the process proceeds to Step S24. On the other hand, when it is not determined that the landmark being checked is located in the specified angular range centering on the viewing direction of the mobile terminal 1, the process proceeds to Step S28.

In Step S24, the visible angle check unit 35 checks whether the landmark extracted by the landmark extraction unit 33 in Step S22 is a landmark that is visible from the located position of the mobile terminal 1 based on the approximate position information and the "visible angle" in the landmark information storage unit 31 (S24). When it is determined that the landmark being checked is a landmark that is visible from the located position of the mobile terminal 1, the process proceeds to Step S25. On the other hand, when it is not determined that the landmark being checked is a landmark that is visible from the located position of the mobile terminal 1, the process proceeds to Step S28.

In Step S25, the display size check unit 36 checks whether, the landmark extracted by the landmark extraction unit 33 is a landmark where, when a landmark photographed by the landmark photographing unit 14 of the mobile terminal 1 is displayed on a display unit (not shown) of the mobile terminal 1, the size of a region occupied by the image of the landmark with respect to the whole image on the display unit is within the range of a predetermined size (S25). When it is determined that the landmark being checked is a landmark that is displayed within the range of a specified size when displayed on the mobile terminal 1, the process proceeds to Step S26. On the other hand, when it is not determined that the landmark being checked is a landmark that is displayed within the range of a specified size when displayed on the mobile terminal 1, the process proceeds to Step S28.

In Step S26, the shield retrieval unit 37 checks whether the landmark extracted by the landmark extraction unit 33 is a landmark with no shield between the approximate position of the mobile terminal 1 and the landmark based on the map data stored in the map data storage unit 42 and the approximate position information (S26). When it is determined that the landmark being checked is a landmark with no shield between the approximate position of the mobile terminal 1 and the landmark, the landmark retrieval unit 32 sends the landmark information of the landmark to the landmark information transmitting unit 38, and the landmark retrieval process thereby ends (S27). On the other hand, when it is not determined that the landmark being checked is a landmark with no shield between the approximate position of the mobile terminal 1 and the landmark, the process proceeds to Step S28.

In Step S28, the landmark retrieval unit 32 retrieves a landmark whose distance from the approximate position is the second shortest to the landmark extracted in Step S22 among the landmarks extracted by the landmark extraction unit 33 (S28).

When one or more landmarks are extracted in Step S28, the process proceeds to Step S30 (S29). On the other hand, when one or more landmarks are not extracted in Step S28, the process proceeds to Step S31 (S29).

In Step S29, the landmark retrieval unit 32 determines whether the number of times of retrieving a landmark in Steps S22 and S28 reaches a specified number (N times). When the number of landmark retrievals has reached N times, the process proceeds to Step S31. On the other hand, when the number of landmark retrievals has not reached N times, the process proceeds to Step S23.

In Step S31, the landmark retrieval unit 32 notifies the mobile terminal 1 that there is no landmark information to be transmitted to the mobile terminal 1 through the landmark information transmitting unit 38. In this case, after the processing of Step S5 in FIG. 7 ends, the process of the terminal location specifying method ends without performing the processing after Step S6.

Referring back to FIG. 7, in Step S6, the landmark information transmitting unit 38 transmits the landmark information retrieved by the landmark retrieval unit 32 to the mobile terminal 1 (S6, landmark information transmitting step).

Then, the landmark information receiving unit 13 receives the landmark information from the server 3 (S7, landmark information receiving step). Next, the mobile terminal 1 activates the landmark photographing unit 14 (S8). Note that, although the landmark photographing unit 14 is activated in Step S8 in this embodiment, it may be activated at the point of time when the process of the terminal location specifying method shown in the flowchart of FIG. 7 is started or at some point before the process is started.

Next, a user who has recognized the located position or the like of the landmark based on the landmark information activates the landmark photographing unit 14, and the landmark photographing unit 14 photographs and acquires the image of the landmark (S9, landmark photographing step).

Note that, when the landmark indicated by the landmark information received in Step S7 is not found in the vicinity of the mobile terminal 1, the mobile terminal 1 may transmit a request for transmitting landmark information of another landmark that can be a candidate for photographing to the server 1. In this case, the landmark retrieval unit 32 of the server 1 extracts another landmark information by performing the processing of Steps S23 to S30 again.

After that, the landmark image transmitting unit 15 transmits the landmark image acquired from the landmark photographing unit 14 to the server 3 (S10, landmark image transmitting step).

In Step S11, the landmark image receiving unit 39 receives the landmark image transmitted from the mobile terminal 1 (S11, landmark image receiving step). Next, the terminal position analysis unit 40 analyzes the position of the mobile terminal 1 at the time when the landmark image has been photographed based on the landmark image received by the landmark image receiving unit 39 in Step S11 (S12, terminal position analysis step). Then, the terminal position information transmitting unit 41 transmits the position of the mobile terminal 1 analyzed by the terminal position analysis unit 40 as terminal position information to the mobile terminal (S13, terminal position information transmitting step).

Then, the position information receiving unit 16 receives the terminal position information analyzed in the server 3 from the server 3 (S14, position information receiving step). After that, the position information management unit 17 manages the position indicated by the terminal position information received by the position information receiving unit 16 as the located position of the mobile terminal 1 and uses the terminal position information for the correction of the position of its own terminal (S15, position information management step). The process according to this embodiment thereby ends.

Note that, although the checking and extraction of a landmark are performed in Steps S23 to S27 as shown in FIG. 8 in the landmark retrieval process according to this embodiment, the processing of Steps S23, S24, S25 (S26, S27) may be performed in a different order.

Further, in the landmark retrieval process, the processing of Step S23 may be skipped. Specifically, the landmark retrieval unit 32 may refrain from using the direction information in the landmark retrieval process. In this case, the direction measurement unit 11 may be eliminated from the mobile terminal 1. Further, the mobile direction check unit 34 may be eliminated from the server 3.

Further, in the landmark retrieval process, the processing of Steps S26 and S27 may be skipped. Specifically, the landmark retrieval unit 32 may refrain from determining the presence or absence of a shield in the landmark retrieval process. In this case, the shield retrieval unit 37 may be eliminated from the server 3.

Further, in the landmark retrieval process, the processing of Step S24 may be skipped. Specifically, the landmark retrieval unit 32 may refrain from considering the visible angle of a landmark in the landmark retrieval process. In this case, the visible angle check unit 35 may be eliminated from the server 3.

Further, in the landmark retrieval process, the processing of Step S25 may be skipped. Specifically, the landmark retrieval unit 32 may refrain from considering the size of a landmark image on the mobile terminal 1 in the landmark retrieval process. In this case, the display size check unit 36 may be eliminated from the server 3.

Further, because an approximate position measured by the approximate position measurement unit 10 contains measurement errors caused by the principle of measurement, the approximate position information may contain measurement error information of the approximate position. In this case, the approximate position information transmitting unit 12 transmits the approximate position information containing the measurement error information to the server 3, and the server 3 that has received the measurement error information can change the condition for retrieving a landmark in the landmark retrieval unit 32 according to the degree of measurement errors. For example, when the error indicated by the measurement error information is larger than a predetermined specified value, the landmark retrieval unit 32 changes the "specified distance" at the time when extracting a landmark in the landmark extraction unit 33 to be a larger value.

Further, the position information management unit 17 may calculate an error between the terminal position information acquired in Step S15 and the approximate position information and notifies the calculated error information to the server 3. The server 3 that has received the error information can change the condition for retrieving a landmark in the landmark retrieval unit 32 according to the degree of errors. For example, when the error indicated by the error information is larger than a predetermined first specified value and smaller than a second specified value, the landmark retrieval unit 32 changes the "specified distance" at the time when extracting a landmark in the landmark extraction unit 33 to be a smaller value in order to prevent extraction of a landmark that causes difficulties in photographing of the landmark and position analysis of the mobile terminal 1. Further, when the error indicated by the error information is larger than the predetermined second specified value, the landmark retrieval unit 32 changes the "specified distance" at the time when extracting a landmark in the landmark extraction unit 33 to be a larger value in order to prevent that a landmark to be photographed is not found in the vicinity of the mobile terminal 1.

In the terminal location specifying system 7, the mobile terminal 1 and the terminal location specifying method according to the first embodiment described above, based on approximate position information of the mobile terminal 1, landmark information of a landmark located within a specified distance from the approximate position is retrieved, and the retrieved landmark information is transmitted to the mobile terminal 1. The mobile terminal 1 can thereby acquire the landmark information related to the landmark located in the vicinity of the mobile terminal. Further, because the landmark information stored in advance in the server 3 is transmitted to the mobile terminal 1, it is possible to reliably specify the position of the mobile terminal 1 based on the landmark image. Then, the photographing position of the image is analyzed based on the landmark image, and the photographing position is managed as the located position of the mobile terminal 1 in the mobile terminal 1 and used for the correction of the position, and it is thus possible to accurately specify the position of the mobile terminal 1.

Second Embodiment

Figure 9:
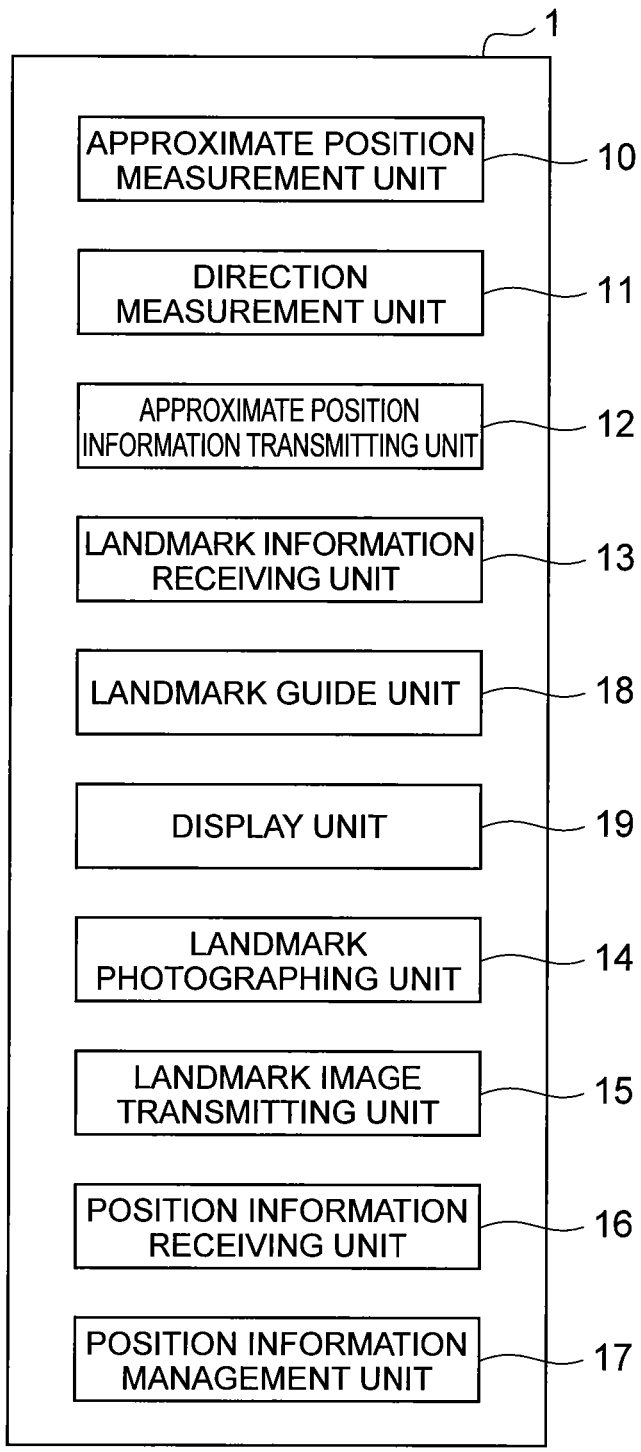
FIG. 9 is a block diagram showing a functional configuration of a mobile terminal according to a second embodiment.

FIG. 9 is a block diagram showing a functional configuration of a mobile terminal 1 according to a second embodiment. The mobile terminal 1 according to the second embodiment includes a landmark guide unit 18 (landmark guide means) and a display unit 19 (display means) in addition to the functional units 10 to 17 included in the mobile terminal 1 according to the first embodiment.

The landmark guide unit 18 is a part that displays guide information that provides a guide to the position of a landmark on the display unit 19 included in the mobile terminal 1 based on a positional relationship between the approximate position of the mobile terminal 1 and the located position of the landmark indicated by landmark position information. The display unit 19 is a part that displays the guide information generated by the landmark guide unit. The landmark information contains landmark position information indicating the located position of the landmark and information about the height of a position where the landmark is located.

Specifically, the landmark guide unit 18 calculates the relative position of the landmark with respect to the approximate position of the mobile terminal 1, the direction in which the landmark is located, and the distance to the landmark as the guide information. The landmark guide unit 18 then displays the calculated guide information on the display unit 19. FIG. 10 is a diagram showing an example of the guide information displayed on the display unit 19. As shown in FIG. 10(*a*), the display unit 19 displays guide information $I_1$ superimposed on an image of the real space captured by a camera included in the mobile terminal 1. The guide information $I_1$ indicates the distance to the position of the landmark "signboard XXX", the direction and height where the landmark "signboard XXX" is located, and the direction to rotate the mobile terminal 1 in order to photograph the landmark.

Further, as shown in FIG. 10(*b*), the display unit 19 displays guide information $I_2$ superimposed on an image of the landmark "signboard XXX" captured at the front of the mobile terminal 1. The guide information $I_2$ indicates the distance to the position of the landmark "signboard XXX", the direction and height where the landmark "signboard XXX" is located, and the direction to rotate the mobile terminal 1 in order to photograph the landmark.

Figure 11:
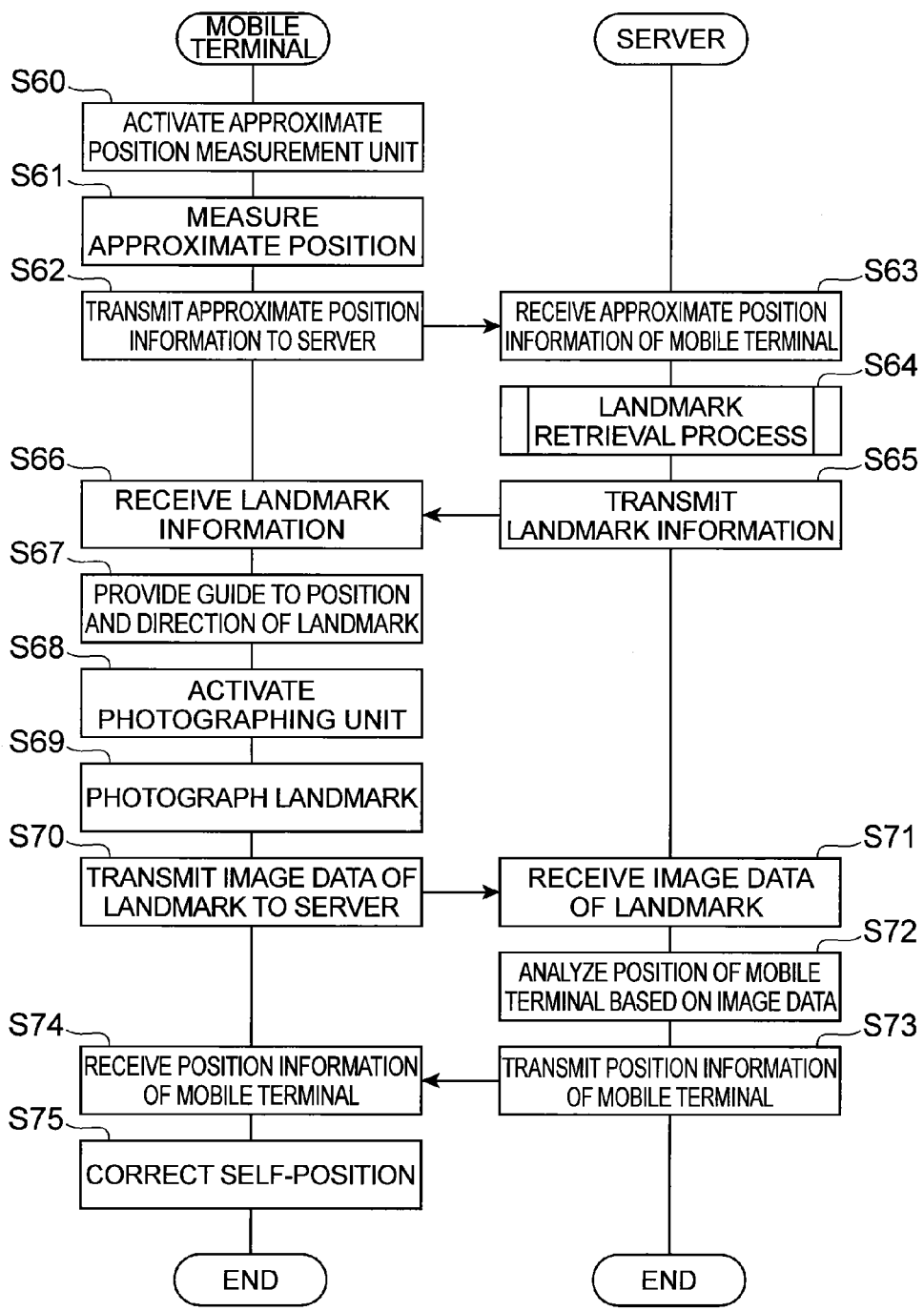
FIG. 11 is a timing chart showing a process of a terminal location specifying method according to the second embodiment.

The operation of the terminal location specifying system 7 in a terminal location specifying method according to the second embodiment is described hereinafter with reference to FIG. 11. FIG. 11 is a flowchart showing a process performed in the terminal location specifying system 7 according to the second embodiment.

The processing of Steps S60 to S66 is the same as the processing of Steps S1 to S7 in the first embodiment (FIG. 7), respectively. In Step S67, the landmark guide unit 18 generates guide information based on a positional relationship between the approximate position of the mobile terminal 1 and the located position of the landmark indicated by landmark position information and displays the generated guide information on the display unit 19. By displaying the guide information, a user of the mobile terminal 1 can easily recognize the located position of the landmark.

The processing of Steps S68 to S75 is the same as the processing of Steps S8 to S15 in the first embodiment (FIG. 7), respectively.

In the terminal location specifying system 7 according to the second embodiment described above, because the located position of a landmark is guided to a user through the display unit 19 of the mobile terminal 1, the user can reliably recognize the position of the landmark. Accordingly, the photographing and acquisition of the landmark image can be performed easily. Further, because information related to the height of the location of a landmark is also guided to a user through the display unit 19 of the mobile terminal 1, the user can more reliably recognize the position of the landmark. The photographing and acquisition of the landmark image can be thereby performed reliably.

Third Embodiment

Figure 12:
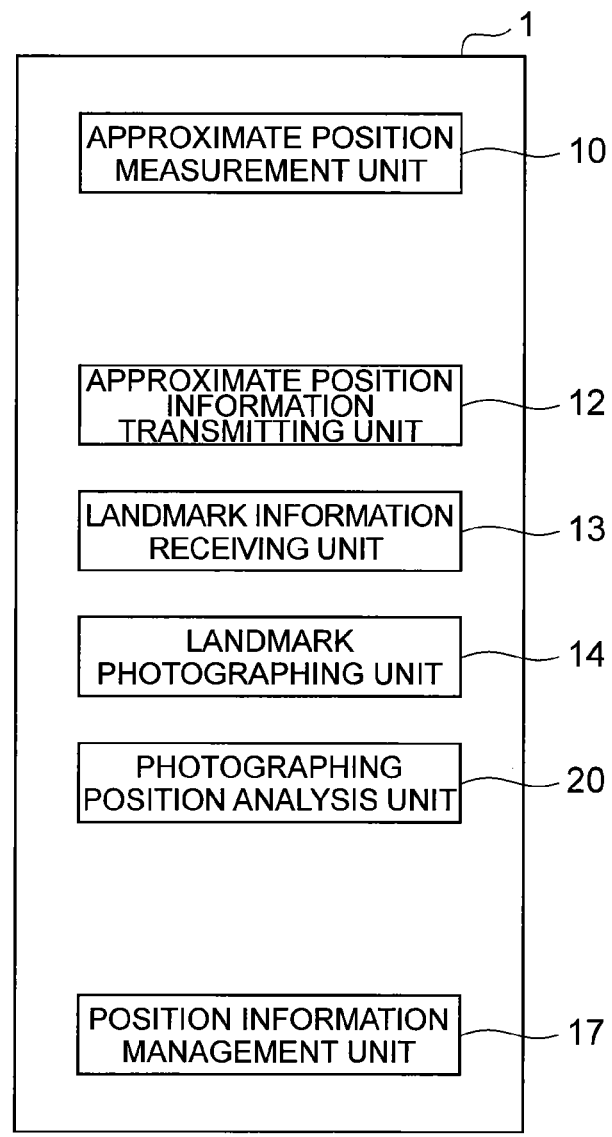
FIG. 12 is a block diagram showing a functional configuration of a mobile terminal according to a third embodiment.

A third embodiment is different from the first embodiment in that the analysis of the position of the mobile terminal 1 when a landmark image has been photographed is performed not in the server 3 but in the mobile terminal 1. FIG. 12 is a block diagram showing the functional configuration of the mobile terminal 1 according to the third embodiment. The mobile terminal 1 according to the third embodiment includes a photographing position analysis unit 20 (photographing position analysis means) in addition to the functional units 10, 12 to 14 and 17 included in the mobile terminal 1 according to the first embodiment.

The photographing position analysis unit 20 is a part that analyzes the position of the mobile terminal 1 when a landmark image has been photographed based on the landmark image photographed by the landmark photographing unit 14. Specifically, the photographing position analysis unit 20 analyzes the position of the mobile terminal 1 when a landmark image has been photographed based on a difference between information about the position, size and shape of a landmark in the real spaced contained in the landmark information received by the landmark information receiving unit and the position, size and shape of a landmark in the landmark image.

Figure 13:
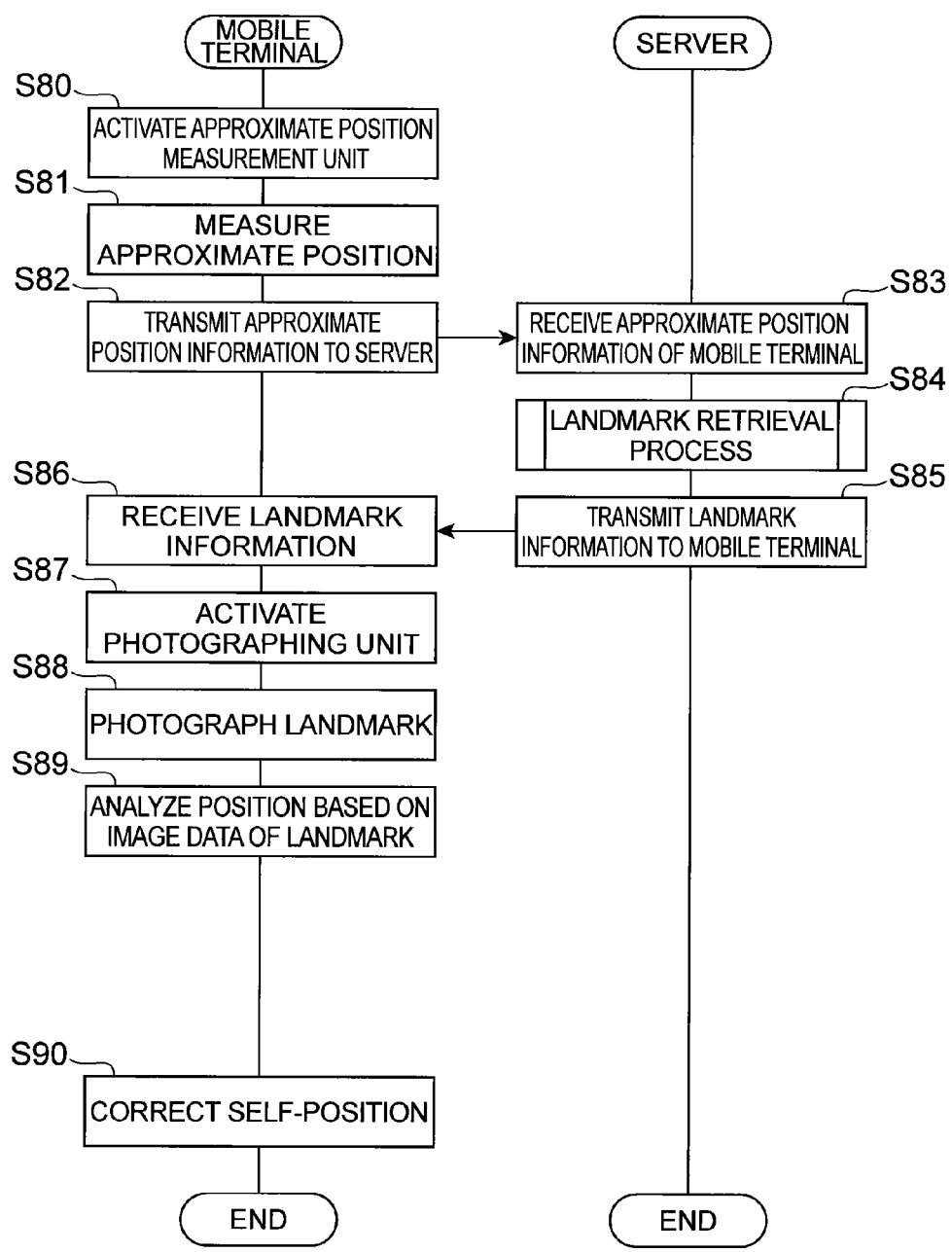
FIG. 13 is a timing chart showing a process of a terminal location specifying method according to the third embodiment.

The operation of the terminal location specifying system 7 in a terminal location specifying method according to the third embodiment is described hereinafter with reference to FIG. 13. FIG. 13 is a flowchart showing a process performed in the terminal location specifying system 7 according to the third embodiment.

The processing of Steps S80 to S88 is the same as the processing of Steps S1 to S9 in the first embodiment (FIG. 7), respectively.

In Step S89, the photographing position analysis unit 20 analyzes the position of the mobile terminal 1 when a landmark image has been photographed based on the landmark image photographed by the landmark photographing unit 14 (S89, photographing position analysis step).

Then, the position information management unit 17 manages the position indicated by the terminal position information analyzed by the photographing position analysis unit 20 as the located position of the mobile terminal 1 and uses the terminal position information for the correction of the position of its own terminal (S90, position information management step). The process according to this embodiment thereby ends.

In the terminal location specifying system 7, the mobile terminal 1 and the terminal location specifying method according to the third embodiment described above, based on approximate position information of the mobile terminal 1, landmark information of a landmark located within a specified distance from the approximate position is retrieved, and the retrieved landmark information is transmitted to the mobile terminal 1. The mobile terminal 1 can thereby acquire the landmark information related to the landmark located in the vicinity of the mobile terminal 1. Further, because the landmark information stored in advance in the server 3 is transmitted to the mobile terminal 1, it is possible to reliably specify the position of the mobile terminal 1 based on the landmark image. Then, in the mobile terminal 1, the photographing position of the image is analyzed based on the landmark image, and the photographing position is managed as the located position of the mobile terminal 1, and it is thus possible to accurately and easily specify the position of the mobile terminal 1.

The embodiments of the present invention are described in detail above. However, the present invention is not restricted to the above-described embodiments, and various changes and modifications may be made without departing from the scope of the invention.

INDUSTRIAL APPLICABILITY

According to the present invention, it is possible to accurately and reliably specify the position of the mobile terminal in the AR technology.

REFERENCE SIGNS LIST

1 . . . mobile terminal, 3 . . . server, 5 . . . base station, 7 . . . terminal location specifying system, 10 . . . approximate position measurement unit, 11 . . . direction measurement unit, 12 . . . approximate position information transmitting unit, 13 . . . landmark information receiving unit, 14 . . . landmark photographing unit, 15 . . . landmark image transmitting unit, 16 . . . position information receiving unit, 17 . . . position information management unit, 18 . . . landmark guide unit, 19 . . . display unit, 20 . . . photographing position analysis unit, 30 . . . approximate position information receiving unit, 31 . . . landmark information storage unit, 32 . . . landmark retrieval unit, 33 . . . landmark extraction unit, 34 . . . mobile direction check unit, 35 . . . visible angle check unit, 36 . . . display size check unit, 37 . . . shield retrieval unit, 38 . . . landmark information transmitting unit, 39 . . . landmark image receiving unit, 40 . . . terminal position analysis unit, 41 . . . terminal position information transmitting unit, 42 . . . map data storage unit, $C_A$ . . . shield, $I_1, I_2$ . . . guide information, $L_A, L_B, L_C$ . . . landmark, P . . . user

The invention claimed is:

1. A terminal location specifying system for specifying a position of a mobile terminal, the system including the mobile terminal and a server capable of communicating with the mobile terminal, the mobile terminal comprising:
a camera; and
circuitry configured to
measure an approximate position where the mobile terminal is located;
perform a first transmission step to transmit approximate position information about the measured approximate position to the server;
receive landmark information about a landmark from the server, the landmark being a photographing object to be photographed by the mobile terminal for specifying a specific position of the mobile terminal;
control the camera to photograph the landmark indicated by the received landmark information based on a user operation;
perform a second transmission step to transmit a landmark image being an image of the photographed landmark to the server;
receive terminal position information indicating a specific position of the mobile terminal after the landmark image has been analyzed by the server; and
manage a position indicated by the received terminal position information as a located position of the mobile terminal, and the server comprising:
a memory configured to store a plurality of landmark information;
circuitry configured to
receive the approximate position information transmitted from the mobile terminal;
retrieve the landmark information of the landmark located within a pre-specified distance from the approximate position from the memory based on the received approximate position information;
transmit the retrieved landmark information to the mobile terminal;
receive the landmark image transmitted from the mobile terminal;
analyze the received landmark image and determine the specific position of the mobile terminal based on the analysis of the received landmark image; and
transmit the determined specific position of the mobile terminal as terminal position information to the mobile terminal, wherein
the landmark information contains landmark position information indicating a located position of the landmark, and
the circuitry of the mobile terminal is further configured to control display of guide information providing directions to the position of the landmark on a display included in the mobile terminal based on a positional relationship between the approximate position of the mobile terminal and the located position of the landmark indicated by the landmark position information.

2. The terminal location specifying system according to claim 1, the
circuitry of the mobile terminal being further configured to measure a viewing direction being a direction of sight in the camera
transmit, in the first transmission step, information about the measured viewing direction as direction information, together with the approximate position information, to the server, and
the circuitry of the server is further configured to retrieve the landmark information of the landmark located within a pre-specified distance from the approximate position indicated by the approximate position information and located in a specified angular range centering on the viewing direction indicated by the direction information.

3. The terminal location specifying system according to claim 1,
the memory of the server being configured to store map data, and
the circuitry of the server refers to the memory and retrieves the landmark information of the landmark located within a pre-specified distance from the approximate position indicated by the approximate position information and where a shield does not exist between the approximate position and the landmark.

4. The terminal location specifying system according to claim 1, wherein
the landmark information contains a visible angle being information indicating an angular range with respect to a facing direction of the landmark where the landmark is visible, and
when the approximate position is located within the angular range indicated by the visible angle of the landmark, the circuitry of the server retrieves the landmark information of the landmark.

5. The terminal location specifying system according to claim 1, wherein
the circuitry of the server retrieves the landmark information of the landmark where, when the landmark is photographed by the camera, a region size of an image of the landmark with respect to a whole photographed image is within a range of a prescribed size.

6. The terminal location specifying system according to claim 1, wherein
the landmark information contains information about a height of a position where the landmark is located, and
the circuitry controls display of the position and height of the landmark as the guide information on the display.

7. The terminal location specifying system according to claim 1, wherein
the circuitry of the server analyzes the position of the mobile terminal after the landmark image has been photographed based on a difference between a position, size and shape of the landmark in a real space and a position, size and shape of the landmark in the landmark image.

8. A terminal location specifying system for specifying a position of a mobile terminal, the system including the mobile terminal and a server capable of communicating with the mobile terminal,
the mobile terminal comprising:
a camera; and
circuitry configured to
measure an approximate position where the mobile terminal is located;
transmit approximate position information about the measured approximate position to the server;
receive landmark information about a landmark from the server, the landmark being a photographing object to be photographed by the mobile terminal for specifying a specific position of the mobile terminal;
control the camera to photograph the landmark indicated by the received landmark information based on a user operation;
analyze the photographed landmark image and determine the specific position of the mobile terminal based on the analysis of the photographed landmark image;
manage information about the determined specific position of the mobile terminal, and
the server comprising:
a memory configured to store a plurality of landmark information; and
circuitry configured to
receive the approximate position information transmitted from the mobile terminal;
retrieve the landmark information of the landmark located within a pre-specified distance from the approximate position from the memory based on the received approximate position information; and
transmit the retrieved landmark information to the mobile terminal,
wherein
the landmark information contains landmark position information indicating a located position of the landmark, and
the circuitry of the mobile terminal is further configured to control display of guide information providing directions to the position of the landmark on a display included in the mobile terminal based on a positional relationship between the approximate position of the mobile terminal and the located position of the landmark indicated by the landmark position information.

9. A mobile terminal in a terminal location specifying system for specifying a position of a mobile terminal, the system including the mobile terminal and a server capable of communicating with the mobile terminal, the mobile terminal comprising:
a camera; and
circuitry configured to
measure an approximate position where the mobile terminal is located;
perform a first transmission step to transmit approximate position information about the measured approximate position to the server;
receive landmark information about a landmark from the server, the landmark being a photographing object to be photographed by the mobile terminal for specifying a specific position of the mobile terminal;
control the camera to photograph the landmark indicated by the received landmark information based on a user operation;
perform a second transmission step to transmit a landmark image being an image of the photographed landmark to the server;
receive terminal position information indicating a specific position of the mobile terminal after the landmark image has been analyzed by the server; and
manage a position indicated by the received terminal position information as a located position of the mobile terminal,
wherein
the landmark information contains landmark position information indicating a located position of the landmark, and
the circuitry of the mobile terminal is further configured to control display of guide information providing directions to the position of the landmark on a display included in the mobile terminal based on a positional relationship between the approximate position of the mobile terminal and the located position of the landmark indicated by the landmark position information.

10. A mobile terminal in a terminal location specifying system for specifying a position of a mobile terminal, the system including the mobile terminal and a server capable of communicating with the mobile terminal, the mobile terminal comprising:
a camera; and
circuitry configured to
measure an approximate position where the mobile terminal is located;
transmit approximate position information about the measured approximate position to the server;
receive landmark information about a landmark from the server, the landmark being a photographing object to be photographed by the mobile terminal for specifying a specific position of the mobile terminal;
control the camera to photograph the landmark indicated by the received landmark information based on a user operation;
analyze the photographed landmark image and determine the specific position of the mobile terminal based on the analysis of the photographed landmark image; and
manage information about the determined specific position of the mobile terminal,
wherein
the landmark information contains landmark position information indicating a located position of the landmark, and
the circuitry of the mobile terminal is further configured to control display of guide information providing directions to the position of the landmark on a display included in the mobile terminal based on a positional relationship between the approximate position of the mobile terminal and the located position of the landmark indicated by the landmark position information.

11. A terminal location specifying method in a terminal location specifying system for specifying a position of a mobile terminal, the system including the mobile terminal and a server capable of communicating with the mobile terminal, the method comprising:

at the mobile terminal:
    measuring an approximate position where the mobile terminal is located;
    performing a first transmission step to transmit approximate position information about the measured approximate position to the server;
    receiving landmark information about a landmark from the server, the landmark being a photographing object to be photographed by the mobile terminal for specifying a specific position of the mobile terminal;
    photographing, by a camera, the landmark indicated by the received landmark information based on a user operation;
    performing a second transmission step to transmit a landmark image being an image of the photographed landmark to the server;
    receiving terminal position information indicating a specific position of the mobile terminal after the landmark image has been analyzed by the server; and
    managing a position indicated by the received terminal position information as a located position of the mobile terminal, and at the server:
    receiving the approximate position information transmitted from the mobile terminal;
    storing a plurality of landmark information in a memory;
    retrieving the landmark information of the landmark located within a pre-specified distance from the approximate position from the memory based on the received approximate position information;
    transmitting the retrieved landmark information to the mobile terminal;
    receiving the landmark image transmitted from the mobile terminal;
    analyzing the received landmark image and determining the specific position of the mobile terminal based on the analysis of the received landmark image; and
    transmitting the determined specific position of the mobile as terminal position information to the mobile terminal, wherein
the landmark information contains landmark position information indicating a located position of the landmark, and
the mobile terminal performs displaying guide information providing directions to the position of the landmark on a display included in the mobile terminal based on a positional relationship between the approximate position of the mobile terminal and the located position of the landmark indicated by the landmark position information.

12. A terminal location specifying method in a terminal location specifying system for specifying a position of a mobile terminal, the system including the mobile terminal and a server capable of communicating with the mobile terminal, the method comprising:

at the mobile terminal:
    measuring an approximate position where the mobile terminal is located;
    transmitting approximate position information about the measured approximate position to the server;
    receiving landmark information about a landmark from the server, the landmark being a photographing object to be photographed by the mobile terminal for specifying a specific position of the mobile terminal;
    photographing, by a camera, the landmark indicated by the received landmark information based on a user operation;
    analyzing the photographed landmark image and determining the specific position of the mobile terminal based on the analysis of the photographed landmark image; and
    managing information about the determined specific position of the mobile terminal, and at the server:
    storing a plurality of landmark information in a memory;
    receiving the approximate position information transmitted from the mobile terminal;
    retrieving the landmark information of the landmark located within a pre-specified distance from the approximate position from the memory based on the received approximate position information; and
    transmitting the retrieved landmark information to the mobile terminal, wherein
the landmark information contains landmark position information indicating a located position of the landmark, and
the mobile terminal performs displaying of guide information providing directions to the position of the landmark on a display included in the mobile terminal based on a positional relationship between the approximate position of the mobile terminal and the located position of the landmark indicated by the landmark position information.

13. The terminal location specifying system according to claim 1, wherein the measurement of the approximate position of the mobile terminal is made using a GPS device.

* * * * *